United States Patent
Mandler

(10) Patent No.: US 10,168,548 B2
(45) Date of Patent: Jan. 1, 2019

(54) OPTICAL LENS BLANK, A BLANK ASSORTMENT AND A METHOD FOR THE PRODUCTION OF LENSES

(71) Applicant: OptoTech Optikmaschinen GmbH, Wettenberg (DE)

(72) Inventor: Roland Mandler, Heuchelheim (DE)

(73) Assignee: OPTOTECH OPTIKMASCHINEN GMBH, Wettenberg (DE)

( * ) Notice: Subject to any disclaimer, the term of this patent is extended or adjusted under 35 U.S.C. 154(b) by 0 days.

(21) Appl. No.: 15/433,135

(22) Filed: Feb. 15, 2017

(65) Prior Publication Data

US 2017/0235156 A1 Aug. 17, 2017

(30) Foreign Application Priority Data

Feb. 17, 2016 (DE) .................. 10 2016 102 741

(51) Int. Cl.
*G02C 7/02* (2006.01)

(52) U.S. Cl.
CPC .............. *G02C 7/022* (2013.01); *G02C 7/02* (2013.01); *G02C 2202/08* (2013.01)

(58) Field of Classification Search
CPC .................... G02C 7/022; G02C 2202/08
USPC .................. 359/159.73, 159.01, 41
See application file for complete search history.

(56) References Cited

U.S. PATENT DOCUMENTS

| 3,950,082 A | 4/1976 | Volk | |
| 5,648,832 A * | 7/1997 | Houston | A61F 9/02 351/159.02 |
| 5,689,323 A | 11/1997 | Houston | |
| 5,774,201 A * | 6/1998 | Tackles | G02C 7/02 351/159.01 |

FOREIGN PATENT DOCUMENTS

| EP | 1691232 A1 | 8/2006 |
| EP | 1990676 A2 | 11/2008 |
| WO | 9721137 A1 | 6/1997 |

OTHER PUBLICATIONS

European Search Report for European Application No. 16206416 dated Jun. 28, 2017, 7 pages.

* cited by examiner

*Primary Examiner* — Tuyen Tra
(74) *Attorney, Agent, or Firm* — TraskBritt

(57) ABSTRACT

An optical lens blank includes a first and a second lens surface, which are arranged opposite each other and which are delimited at a lens circumference, wherein the first lens surface has a surface geometry that corresponds to a first partial cutout from a first melon shape. A range of blanks consisting of such lens blanks have first lens surfaces of varying degrees of curvature, wherein the different degrees of curvature are based on different melon shapes. Finally, a method for producing a spectacle lens from such an optical lens blank includes mechanically shaping at least the first or second surface, and separating a cutout from the mechanically shaped lens blank.

16 Claims, 3 Drawing Sheets

OPTICAL LENS BLANK, A BLANK ASSORTMENT AND A METHOD FOR THE PRODUCTION OF LENSES

PRIORITY CLAIM

This application claims the benefit of the filing date of German Patent Application Serial No. DE 10 2016 102 741.3, filed Feb. 17, 2016, for "Optical Lens Blank, a Range of Blanks, and a Method for Producing a Spectacle Lens," the disclosure of which is incorporated herein by reference.

TECHNICAL FIELD

The invention relates to optical lens blanks, a range of blanks, and methods for producing a spectacle lens from an optical lens blank.

BACKGROUND

Optical lens blanks for producing spectacle lenses are often produced, without cutting, from plastic or silicate glass and preferably have a circular lens circumference. Lens blanks made of plastic are generally obtained by moulding or injection moulding, and lens blanks made of silicate glass are generally produced by immersing heated glass rounds into moulds. The lens blanks often already have a first lens surface (in most cases the front) with an optical effect, that is to say the first lens surface does not have to be reworked. An opposite second lens surface (in most cases the rear) is later reworked by means of CNC machinery.

The second lens surface is reworked in most cases according to a prescription that describes the individual visual defect of a prescription holder. To rework the second lens surface, a prescription surface is calculated on the basis of the prescription and of the geometry of the first lens surface. This prescription surface is worked out from the second lens surface and then, together with the first lens surface, forms a prescription lens which corrects the visual defect of the prescription holder. To this end, mechanical working is in most cases first carried out, for example, by turning, milling and grinding. The mechanical working is then followed by a polishing operation. In this operation, the roughness of the surfaces is reduced to such an extent that light is no longer improperly scattered and the lens is thus transparent. A spectacle lens is finally obtained by adapting the circumference geometry of the lens blank to a spectacle frame, often referred to as "edging."

Particularly for the correction of presbyopia, it may be necessary for the spectacle lens to have several focuses. The crystalline lens curves to different extents depending on the distance of the object. In presbyopia, this elasticity is limited: the crystalline lens hardens and becomes thicker. This has the effect that the visual defect of the eye for objects at a short distance from the eye (near vision) is different than the visual defect for objects at a far distance (distance vision). To be able to see objects clearly at all distances from the eye, the focus of the eye has to be corrected, depending on the distance of the object from the eye, by a defined focus of a lens. By producing the prescription surface, it is possible to configure a lens in such a way that it has a plurality of focuses in different zones of the spectacle lens. The zone within the spectacle lens is changed by a modification of the viewing direction.

If a spectacle lens has two different focuses, generally one for distance vision, and one for near vision in the lower area of the spectacle lens, then the lens is designated as a bifocal lens. Lenses of this kind are, in most cases, distinguishable by a visible transition between the two areas. If the focus frequently changes to another as the viewing direction changes, in particular, from up to down, the lens is designated as a multifocal lens. In this case, the focus can also be continuously variable.

Most lens blanks for producing spectacle lenses have both a spherical front and a spherical rear. Spherical is to be understood as meaning that the surface is a segment of a sphere or that all the points on the surface lie at a common distance or radius from a center point of the sphere.

Moreover, EP 1 990 676 A2 discloses a lens blank which is asymmetrical and in which only the rear is intended to be reworked. The front of the lens blank is formed by two partial surfaces. While the main surface is a sphere, a toric surface is arranged decentrally in the main surface. This toric surface has a lesser curvature than the main surface and is intended to be arranged subsequently in the lower area of the spectacle lens, in particular, in the area of the spectacle lens that is intended to correct the visual defect in the near-vision range. Toric surfaces or toric lenses serve not only to correct short-sightedness or far-sightedness but also to compensate for astigmatism. Their design is more complicated. On a prescription for toric lenses, the strength is noted in three parts. The individual parts are designated as sphere (sph.), cylinder (cyl.) and axis.

A disadvantage of EP 1 990 676 A2 is that the prismatic effect in the horizontal direction is not taken into consideration. The resultant blurring in the viewing directions to the left and right is an inconvenience to the person wearing the spectacles and, e.g., in the case of a vehicle driver who glances over his shoulder through such spectacles, it also poses a danger to himself and to others. This blurring also means that people wearing such spectacles often also suffer from nausea, headaches and feelings of dizziness. Moreover, the aesthetics of the spectacle lens are impaired, since the transition from the spherical surface to the toric surface on the front of the lens can be seen, in particular, through reflection of light.

BRIEF SUMMARY

The object of the disclosure is to improve the economics and the quality of production of spectacle lenses. It is, in particular, an aim to reduce the prismatic effect in all viewing directions. It is to be ensured that aesthetic demands are met as regards the front surface. Ideally, the number of different lens blanks for a range of blanks should be limited in order to keep storage costs low. The further disadvantages of the prior art are to be overcome.

Certain main features of embodiments of the disclosure are set out in the body of the independent claims. Further embodiments thereof form the subject matter of the dependent claims.

The disclosure relates to an optical lens blank, in particular for producing spectacle lenses, with a first and a second lens surface which are arranged opposite each other and which are delimited at a lens circumference, wherein the first lens surface has a surface geometry that corresponds to a partial cutout from a first melon shape.

The first lens surface configured in this way is of particular advantage, since the melon shape has the effect that it is possible to obtain, from the lens blank, spectacle lenses in which the curvature changes continuously in at least one direction. Along the vertical viewing axis, often also designated as a progression channel, an increase in the curvature of a first lens surface is desirable from the top downward. At the same time, an increase in curvature in the horizontal pivot area, in particular from the nose to the temples, is favorable, which is greater at the lower end of the spectacle lens than at the upper end. Both changes in curvature correspond to the movements of the eyes. To this extent, this can be referred to as a bionic approach, which lies behind the choice of the melon shape. The melon shape allows continuous changes of curvature to be provided even in all surface areas outside the viewing axes. A spectacle lens configured in this way offers a high degree of viewing comfort with a high degree of visual acuity.

In a particular embodiment of the lens blank, the first melon shape is elongated. There is thus a continuously changing curvature along the elongation. This curvature preferably lies parallel to the vertical viewing axis of the subsequent spectacle lens. The curvature in the vertical viewing axis is thus less than in the horizontal viewing axis, which once again conforms to the movements of the eye.

According to a particular variant of the lens blank, the first melon shape is an ellipsoid. An ellipsoid is mathematically defined, such that the calculation of the optical properties of the lens is simple.

In a particular embodiment, the ellipsoid is an ellipsoid of revolution which is, in particular, spanned by three ellipsoid radii, wherein the first and second ellipsoid radii are the same size, and the size of the third ellipsoid radius differs from the size of the first and second ellipsoid radii. This has the effect that there is a continuous change of curvature on the first lens surface in one direction, namely in the position of the third ellipsoid radius. At the same time, in the planes parallel to the plane that is spanned by the first and second ellipsoid radii, circular paths of constant radius are to be found on the lens surface. These constant circular paths in each case preferably lie horizontally in the subsequent spectacle lens. The radius of the circular paths preferably increases from the top downward.

According to another particular embodiment of the lens blank, the ellipsoid is a triaxial ellipsoid which is, in particular, spanned by three ellipsoid radii, wherein the first, second and third ellipsoid radii are each of a different size. This has the effect that a spectacle lens can have continuous changes of curvature in the vertical and horizontal viewing directions. The lens surface preferably has mirror symmetry, so as to be able to produce similar left and right spectacle lenses from a single lens blank.

Moreover, in a particular design of the lens blank, provision is made that the two smaller ellipsoid radii from the group of the first, second and third ellipsoid radii lie at the edge of or outside of the first lens surface. In this way, a continuous increase in the radius of curvature is obtained from a side of the removal area for the spectacle lens to the opposite side of the removal area. Subsequently, in the spectacle lens, the continuous increase in curvature is preferably the vertical viewing axis.

In an optional embodiment of the lens blank, the larger ellipsoid radius from the group of the first, second and third ellipsoid radii is at least as large as the diameter of the lens blank. In this way, the lens surface can be obtained from the melon shape at a location lying to one side of the equator, which is spanned by the two smaller ellipsoid radii.

According to a particular embodiment of the lens blank, the size ratio between the smallest and the largest ellipsoid radius from the group of the first, second and third ellipsoid radii has a factor of between 1.15 and 4.00, preferably between 1.20 and 3.50, and particularly preferably between 1.25 and 3.00. Within these size ratios, a range of blanks can be assembled with which spectacle lenses can be produced for correcting most visual defects.

In one design option, the first lens surface is convex. Such a convex first lens surface can form the front of a spectacle lens. In this way, a harmonic front surface is obtained, for example, without light edges. At the same time, the rear will be oriented substantially perpendicularly with respect to the viewing direction even after machining, since the front is adapted to the eye movement, and the geometry of the rear follows the front at least relatively strongly.

For the production of spectacle lenses, it is expedient that the second lens surface is concave.

Moreover, for rotary machining of the lens blank, it is advantageous if the lens circumference has a circular basic shape.

The second lens surface preferably has a surface geometry that corresponds to a partial cutout from a second melon shape. Thus, a curvature that changes continuously in at least one direction is also formed on the second lens surface.

The size of the second melon shape preferably differs by a multiplication factor from the size of the first melon shape, wherein the first melon shape and the second melon shape have the same shape. As a result of the similarities of the first and second melon shapes, the first and second lens surfaces are adapted to each other.

In a particular variant, provision is made that the first melon shape and the second melon shape have the same spatial orientation and the same center point. This results in a homogeneous thickness of the lens blank.

It is moreover preferable that the second melon shape is elongated. In particular, the second melon shape is preferably an ellipsoid. The ellipsoid of the second melon shape can be an ellipsoid of revolution, which is, in particular, spanned by three ellipsoid radii, wherein the first and second ellipsoid radii are the same size, and the size of the third ellipsoid radius differs from the size of the first and second ellipsoid radii. Alternatively, the ellipsoid of the second melon shape can be a triaxial ellipsoid, which is, in particular, spanned by three ellipsoid radii, wherein the first, second and third ellipsoid radii are each of a different size. To obtain a lens blank, the larger ellipsoid radius from the group of the first, second and third ellipsoid radii should be at least as large as the diameter of the lens blank. As regards the size ratios, embodiments are particularly suitable in which the size ratio between the smallest and the largest ellipsoid radius from the group of the first, second and third ellipsoid radii has a factor of between 1.15 and 4.00, preferably between 1.20 and 3.50, and particularly preferably between 1.25 and 3.00.

The disclosure moreover relates to a range of blanks consisting of 2 to 20, preferably 3 to 12 and particularly preferably 4 to 9 lens blanks as described above and below and with first lens surfaces of different degrees of curvature, wherein the different degrees of curvature are based on different melon shapes.

The range of blanks is therefore such that, for almost all visual defects, it is possible to stock a lens blank from which a spectacle lens can be produced to alleviate the visual defect. The reworking is nowadays carried out using modern CNC machinery, such that complicated surface configurations can also be realized. However, the reworking of a lens blank is limited by the fact that the stability of the lens has to be maintained and the radii of curvature and the material thickness of the lens blank impose restrictions on the changes. Therefore, at least a certain number of different types of lens blanks is needed to be able to produce lenses for the widest possible range of visual defects.

The disclosure further relates to a method for producing a spectacle lens from an optical lens blank of the kind described above and below, comprising the step of mechanically shaping the first and/or second lens surface, and the step of detaching a cutout, which has a partial cutout of the first and second lens surface, from the mechanically shaped lens blank along a frame line.

By means of the method according to the disclosure, a spectacle lens of high visual quality that has been machined on one side is obtained in a small number of work steps from the lens blanks according to the disclosure.

According to a more detailed method set-up, the partial cutout has a vertical sight axis and a horizontal sight axis that intersect in a zero-visual axis, wherein the first and/or second lens surface has a lesser curvature along the vertical sight axis than along the horizontal sight axis.

A spectacle lens is thus obtained whose first lens surface is adapted to the eye movement and to the visual field of a human, wherein in particular, the viewing axis intersects the first lens surface as far as possible perpendicularly.

In a particular method set-up, the partial cutout has a vertical sight axis that intersects a zero-visual axis, wherein the curvature of the first and/or second lens surface along the vertical sight axis increases from a lens upper edge in the direction of a lens lower edge. This takes account of the fact that a person wearing spectacles will rarely direct the line of sight upwards but very much more likely downwards. The curvature along the vertical sight axis thus follows the movement of the eye.

BRIEF DESCRIPTION OF THE DRAWINGS

Further features, details and advantages of the disclosure will become clear from the wording of the claims and also from the following description of illustrative embodiments with reference to the drawings, in which:

DETAILED DESCRIPTION

Figure 1:
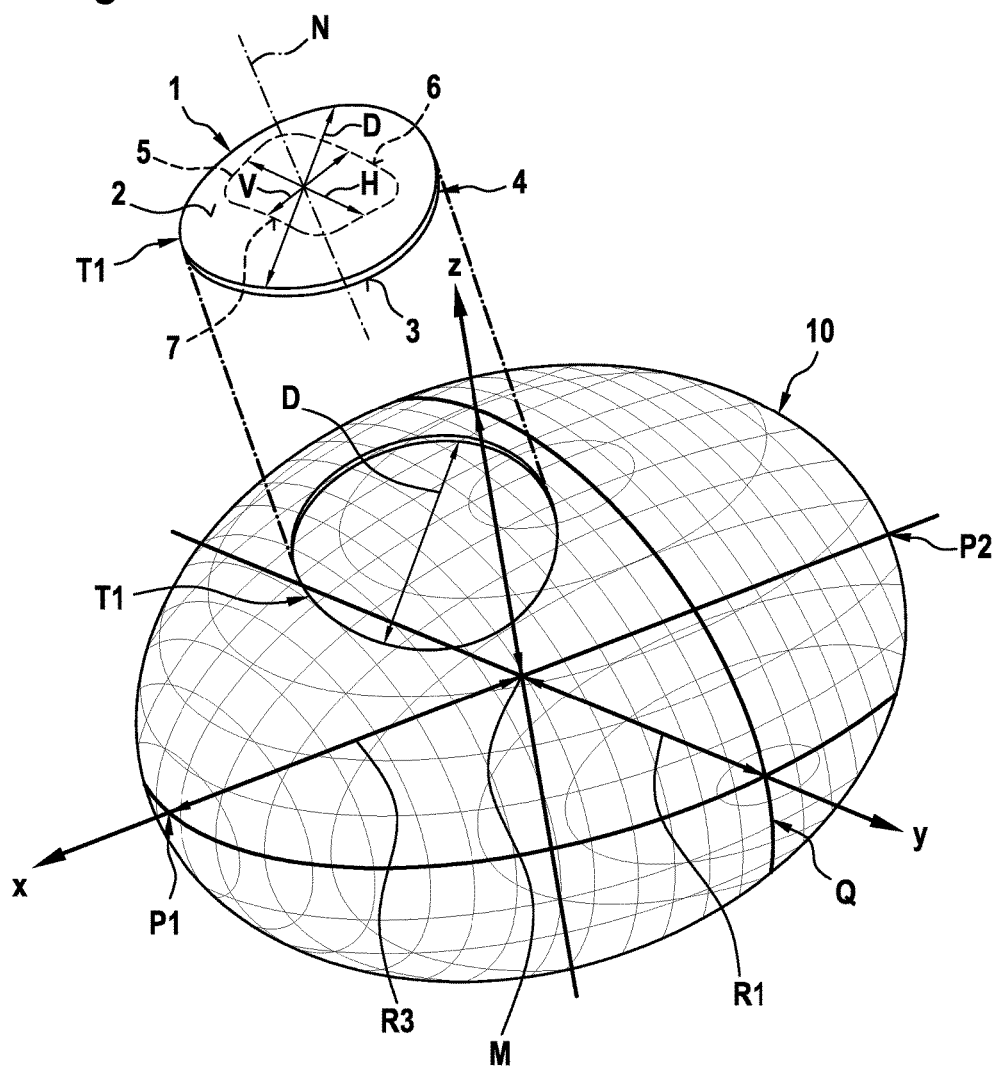
FIG. 1 shows a schematic view of how a first lens surface of an optical lens blank relates to a melon shape.
Figure 3:
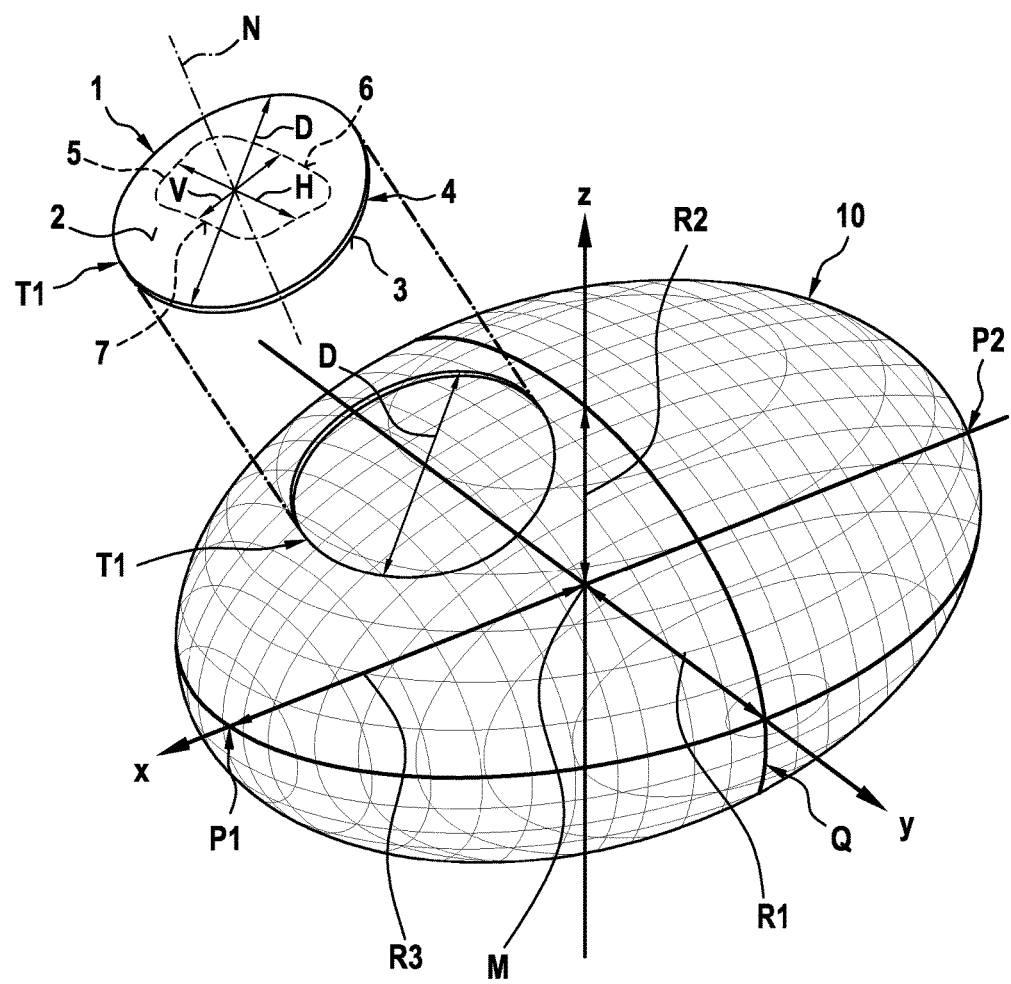
FIG. 3 shows a schematic view of how a first lens surface of an optical lens blank relates to a triaxial ellipsoid.

It will be seen from the schematic view in FIGS. 1 and 3 how a first lens surface 2 of an optical lens blank 1 relates to a first melon shape 10. The lens blank 1 has a first and a second lens surface 2, 3, which are arranged opposite each other and which are delimited at a circumference 4. The lens circumference 4 and therefore also the lens blank 1 have a circular basic shape. The first lens surface 2 is convex and the second lens surface 3 is concave.

In particular, the first lens surface 2 has a lens surface geometry that corresponds to a partial cutout T1 from the first melon shape 10. The position of the partial cutout T1 is indicated on the outer envelope of the first melon shape 10. It will be seen that the first melon shape 10 is elongated, in particular, in the direction of the x coordinate axis.

The first melon shape 10 is an ellipsoid. This ellipsoid according to FIG. 1 is an ellipsoid of revolution which is, in particular, spanned by three ellipsoid radii R1, R2, R3, wherein the first and second ellipsoid radii R1, R2 are the same size, and the size of the third ellipsoid radius R3 differs from the size of the first and second ellipsoid radii R1, R2. Here, the third ellipsoid radius R3 in the direction of the x coordinate axis is larger than the first and second ellipsoid radii R1, R2 of identical size which point in the direction of the y coordinate axis and the z coordinate axis. This also means that the ellipsoid and the first melon shape 10 are not spheres or balls.

As an alternative to the embodiment shown in FIG. 1, the ellipsoid can also be configured as a triaxial ellipsoid according to FIG. 3. This too is spanned by three ellipsoid radii R1, R2, R3, wherein, however, the first, second and third ellipsoid radii R1, R2, R3 are each of a different size. The first ellipsoid radius R1 in the y coordinate axis is larger than the second ellipsoid radius R2 in the z coordinate axis. If the first melon shape 10 is elongated, as is the case here, and the ellipsoid is triaxial, the elongation is understood in the direction of the largest ellipsoid radius. This is the third ellipsoid radius R3 in FIG. 3.

Regardless of whether the ellipsoid is an ellipsoid of revolution or a triaxial ellipsoid, in FIGS. 1 and 3 the equator Q is as it were spanned by the first and second ellipsoid radii R1, R2. The point of intersection of the ellipsoid with the x coordinate axis or the two points of the ellipsoid at the greatest distance from the center point M of the ellipsoid form the two poles P1, P2 of the ellipsoid.

As will be seen from the position of the partial cutout T1, the two smaller ellipsoid radii R1, R2 from the group of the first, second and third ellipsoid radii R1, R2, R3, or the equator Q, lie outside of the first lens surface 2. As can also be seen, the larger or largest ellipsoid radius R3 from the group of the first, second and third ellipsoid radii R1, R2, R3 is at least as large as the diameter D of the lens blank 1. Preferably, the size ratio between the smallest and the largest ellipsoid radius from the group of the first, second and third ellipsoid radii R1, R2, R3 preferably gives a factor of between 1.15 and 4.00, more preferably between 1.20 and 3.50, and particularly preferably between 1.25 and 3.00.

The concave second lens surface 3 has a surface geometry that corresponds to a partial cutout from a second melon shape. Preferably, the size of the second melon shape differs by a multiplication factor from the size of the first melon shape T1, wherein the first melon shape T1 and the second melon shape have the same shape. Provision can optionally be made that the first melon shape T1 and the second melon shape have the same spatial orientation in respect of the x, y and z coordinate axes and the same center point. The second melon shape is then also an elongated ellipsoid. The latter is either configured as an ellipsoid of revolution or is alternatively a triaxial ellipsoid. As will be seen from the partial cutout T1 indicated in FIGS. 1 and 3, this results in an ellipsoid shell from which the lens blank 1 is obtained.

With a lens blank as shown in FIGS. 1 and 3, high-quality spectacle lenses can be produced by first mechanically shaping the second lens surface 3, or, alternatively, the first lens surface 2, or, alternatively, both the first and the second lens surfaces 2, 3. The necessary machining depends on the visual defect of the subsequent wearer of the spectacle lens. To this end, an individual prescription is in most cases established for correcting the visual defect. Based on the prescription, the desired surface geometry of the spectacle lens is calculated. After the surface geometry has been produced, a cutout is separated from the machined lens blank 1, which cutout in each case has a partial cutout of the first and second lens surface 2, 3. The circumference geometry of the lens blank 1 is machined until a frame line 5 is obtained. A spectacle lens is then obtained that has a vertical sight axis V and a horizontal sight axis H, which intersect in a zero-visual axis N (the spectacle lens wearer looking straight ahead). The vertical sight axis V is preferably oriented along and particularly preferably parallel to the plane that is spanned by the x and z coordinate axes and by the second and third ellipsoid radii R2, R3. The horizontal sight axis H is preferably oriented along and particularly preferably parallel to the plane that is spanned by the y and z coordinate axes and by the first and second ellipsoid radii R1, R2.

In addition, the horizontal sight axis H should be oriented at a distance from the plane that is spanned by the y and z coordinate axes. The vertical sight axis V preferably lies closer to the plane that is spanned by the x and z coordinate axes than the horizontal sight axis H lies to the plane that is spanned by the y and z coordinate axes.

In the present configuration, the curvature of the first lens surface 2 along the vertical sight axis V increases continuously from a lens upper edge 6 of the frame line 5 to a lens lower edge 7 of the frame line 5. Along the horizontal sight axis H, the curvature increases continuously from the inside outward. The curvature in the horizontal also becomes greater from the lens upper edge 6 to the lens lower edge 7.

The partial cutout T1 is also chosen such that all the curvatures along the vertical sight axis V are smaller than those along the horizontal sight axis H.

By grading the surface curvatures, or the first and second melon shapes 10 from which these are obtained, it is possible to assemble a range of blanks consisting of several first and second lens surfaces 2, 3 with different degrees of curvature. Depending on the visual defect to be corrected, and possibly also on the desired spectacle frame, it is then possible to select a suitable lens blank 1 from the range of blanks.

Figure 2:
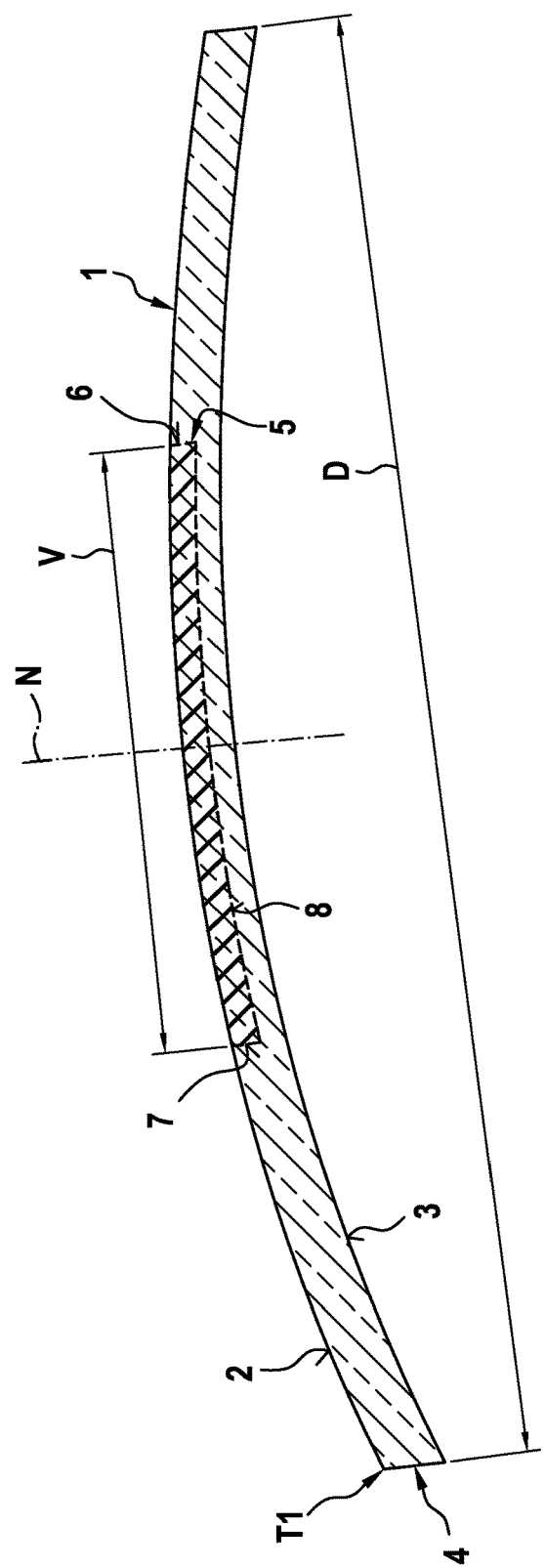
FIG. 2 shows a cross section through an optical lens blank.

FIG. 2 shows a cross section through an optical lens blank 1 of the kind described above, in particular, along the vertical sight axis V. It will also be seen here how the first and second lens surfaces 2, 3 lie opposite each other and are delimited at the lens circumference 4. The first lens surface 2 is based on a circular partial section T1 as is indicated on the envelope of the first melon shape 10 in FIG. 1. The geometry of the second lens surface 3 also corresponds to a circular partial section from the envelope of a melon shape. In this way, the optical lens blank 1 is configured as a round disc with a diameter D.

FIG. 2 also shows the spectacle lens which is to be produced and which is obtained by machining the second lens surface 3 to give a prescription surface 8 and adapting the lens circumference 4 to a frame line 5. Seen in cross section, a lens upper edge 6 and a lens lower edge 7 of the frame line 5 can be seen. Moreover, FIG. 2 shows where the zero-visual axis N lies, along which the subsequent wearer of the spectacles sees when looking straight ahead.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the present disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. An optical lens blank comprising a first and a second lens surface, which are arranged opposite each other and which are delimited at a lens circumference, wherein the first lens surface has a surface geometry that corresponds to a first partial cutout from a first melon shape, wherein the first melon shape is an ellipsoid, and
   (a) wherein the ellipsoid is an ellipsoid of revolution spanned by three ellipsoid radii, wherein the first and second ellipsoid radii have a same size, and a size of the third ellipsoid radius differs from the size of the first and second ellipsoid radii; or
   (b) wherein the ellipsoid is a triaxial ellipsoid spanned by three ellipsoid radii, wherein the first, second, and third ellipsoid radii are each of a different size,
   wherein two smaller ellipsoid radii selected from the group consisting of the first, second, and third ellipsoid radii lie at an edge of or outside of the first lens surface.

2. The lens blank according to claim 1, wherein the first melon shape is elongated.

3. The lens blank according to claim 1, wherein the larger ellipsoid radius from the group of the first, second and third ellipsoid radii is at least as large as the diameter of the lens blank.

4. The lens blank according to claim 1, wherein the size ratio between the smallest and the largest ellipsoid radius from the group of the first, second and third ellipsoid radii has a factor of between 1.15 and 4.00.

5. The lens blank according to claim 1, wherein the first lens surface is convex.

6. The lens blank according to claim 1, wherein the second lens surface is concave.

7. The lens blank according to claim 1, wherein the second lens surface has a surface geometry that corresponds to a partial cutout from a second melon shape.

8. The lens blank according to claim 7, wherein the size of the second melon shape differs by a multiplication factor from the size of the first melon shape, wherein the first melon shape and the second melon shape have the same shape.

9. The lens blank according to claim 8, wherein the first melon shape and the second melon shape have the same spatial orientation and the same center point.

10. The lens blank according to claim 7, wherein the second melon shape is an ellipsoid.

11. A range of blanks consisting of 2 to 20 lens blanks according to claim 1, with first lens surfaces of different degrees of curvature, wherein the different degrees of curvature are based on different melon shapes.

12. The range of blanks according to claim 11, wherein different lens blanks of the range have respective first lens surfaces and second lens surfaces with different degrees of curvature.

13. A method for producing a spectacle lens from an optical lens blank according to claim 1, comprising the following steps:
   mechanically shaping a first lens surface to have a first melon shape, wherein the first melon shape is an ellipsoid, and
   (a) wherein the ellipsoid is an ellipsoid of revolution spanned by three ellipsoid radii, wherein the first and second ellipsoid radii have a same size, and a size of the third ellipsoid radius differs from the size of the first and second ellipsoid radii; or
   (b) wherein the ellipsoid is a triaxial ellipsoid spanned by three ellipsoid radii, wherein the first, second, and third ellipsoid radii are each of a different size,
   wherein two smaller ellipsoid radii selected from the group consisting of the first, second, and third ellipsoid radii lie at an edge of or outside of the first lens surface; and separating a cutout from the mechanically shaped lens blank, which cutout has a partial cutout of the first and second lens surfaces, along a frame line.

14. The method according to claim 13, wherein the partial cutout has a vertical sight axis and a horizontal sight axis that intersect in a zero-visual axis, wherein the first and/or second lens surface has a lesser curvature along the vertical sight axis than along the horizontal sight axis.

15. The method according to claim 13, wherein the partial cutout has a vertical sight axis that intersects a zero-visual axis, wherein a curvature of the first and/or second lens surface along the vertical sight axis increases along a direction from a lens upper edge to a lens lower edge.

16. The lens blank according to claim 1, wherein the larger ellipsoid radius from the group of the first, second and third ellipsoid radii is at least as large as the diameter of the lens blank.

* * * * *